United States Patent
Lin et al.

(10) Patent No.: US 10,853,431 B1
(45) Date of Patent: Dec. 1, 2020

(54) MANAGING DISTRIBUTION OF CONTENT ITEMS INCLUDING URLS TO EXTERNAL WEBSITES

(71) Applicant: Facebook, Inc., Menlo Park, CA (US)

(72) Inventors: Jiun-Ren Lin, Cupertino, CA (US); Daniel Olmedilla de la Calle, Mountain View, CA (US); Emanuel Alexandre Strauss, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 336 days.

(21) Appl. No.: 15/854,667

(22) Filed: Dec. 26, 2017

(51) Int. Cl.
*G06F 16/9535* (2019.01)
*G06N 20/00* (2019.01)
*G06F 16/955* (2019.01)
*G06F 16/958* (2019.01)
*G06F 40/117* (2020.01)
*G06F 16/957* (2019.01)
*H04L 29/06* (2006.01)

(52) U.S. Cl.
CPC ........ *G06F 16/9535* (2019.01); *G06F 16/958* (2019.01); *G06F 16/9566* (2019.01); *G06F 16/9577* (2019.01); *G06F 16/986* (2019.01); *G06F 40/117* (2020.01); *G06N 20/00* (2019.01); *H04L 29/06591* (2013.01)

(58) Field of Classification Search
CPC .............. G06F 16/9566; G06F 16/9535; G06F 16/9577; G06F 40/117; G06F 16/958; G06F 16/954; G06F 16/955; G06F 16/9558; G06F 16/986; G06F 16/95; G06F 16/951; G06F 16/9538; H04L 29/06591; G06N 20/00
See application file for complete search history.

(56) References Cited

U.S. PATENT DOCUMENTS

| | | | |
|---|---|---|---|
| 7,895,515 B1 * | 2/2011 | Oliver | G06F 16/80 715/237 |
| 8,775,924 B1 * | 7/2014 | Bilinski | G06F 40/20 715/234 |
| 9,130,988 B2 * | 9/2015 | Seifert | H04L 63/168 |
| 2007/0027749 A1 * | 2/2007 | Peiro | G06Q 30/00 705/14.4 |
| 2007/0055642 A1 * | 3/2007 | Kim | G06F 16/951 |
| 2008/0091708 A1 * | 4/2008 | Caldwell | G06F 16/951 |
| 2009/0094175 A1 * | 4/2009 | Provos | G06F 21/564 706/12 |

(Continued)

*Primary Examiner* — David T. Brooks
(74) *Attorney, Agent, or Firm* — Fedwick & West LLP

(57) ABSTRACT

An online system determines a quality of content provided by third party systems for distribution to users. The online system analyzes URL's posted within the online system by content providers to determine the quality of content of the webpages obtained by accessing the URLs. For each URL, the online system receives an original markup language document and a copy of the markup document obtained by applying a content filter. The online system extracts features from both markup language documents. The online system provides the extracted features to a machine learning based model to generate a content quality score. The online system categorizes the URL as having high quality content or low quality content. The online system restricts distribution of content items including URLs to websites with low quality content.

20 Claims, 4 Drawing Sheets

(56) References Cited

U.S. PATENT DOCUMENTS

| | | | |
|---|---|---|---|
| 2010/0186088 A1* | 7/2010 | Banerjee | G06F 21/51 |
| | | | 726/23 |
| 2011/0035345 A1* | 2/2011 | Duan | G06K 9/6256 |
| | | | 706/12 |
| 2012/0047427 A1* | 2/2012 | Hauser | G06F 3/03543 |
| | | | 715/234 |
| 2012/0158626 A1* | 6/2012 | Zhu | H04L 63/1408 |
| | | | 706/13 |
| 2012/0159620 A1* | 6/2012 | Seifert | H04L 63/1416 |
| | | | 726/22 |
| 2013/0145255 A1* | 6/2013 | Zheng | G06F 40/103 |
| | | | 715/234 |
| 2013/0238972 A1* | 9/2013 | Woodman | G06F 16/95 |
| | | | 715/234 |
| 2014/0082182 A1* | 3/2014 | Doan | G06F 16/9535 |
| | | | 709/224 |
| 2015/0067476 A1* | 3/2015 | Song | G06F 16/986 |
| | | | 715/234 |
| 2017/0011015 A1* | 1/2017 | Dakua | G06F 3/04842 |
| 2017/0193545 A1* | 7/2017 | Zhou | G06Q 30/0243 |
| 2017/0222960 A1* | 8/2017 | Agarwal | G06N 20/00 |

* cited by examiner

MANAGING DISTRIBUTION OF CONTENT ITEMS INCLUDING URLS TO EXTERNAL WEBSITES

BACKGROUND

This disclosure relates generally to the distribution of content by online systems, and in particular, to managing distribution of content items including uniform resource locators (URLs) of external websites by online systems.

Online systems, such as social networking systems, allow users to connect to and communicate with other users of the online system. Online systems provide content items to users, for example, content items provided by other users or content items provided by third party systems. Often content items include links (URLs) to external websites that provide additional information. For example, a content item that describes a particular topic may include a link to a website that provides additional information about the topic.

Content items often include URLs that link to websites that provide poor quality content. These third party websites sometimes contain minimal content of interest to a user, but a large amount of spam-like content items that may not be of interest to user. Such websites create a poor user experience and foster discontent in the online system by the users. Conventional techniques do not effectively manage/reduce distribution of content items that include such URLs, and thus they provide poor user experience.

SUMMARY

An online system distributes content items to users of the online system. The content items may include uniform resource locators (URLs) provided by third-party content providers which direct users to third party websites. A URL may correspond to a web page that includes low quality content, for example, a web page with excessive sponsored content or other types of unfavorable or spam-like. The online system analyzes the URLs, for example, using machine learning based models to categorize the URL based on the quality of content returned by web pages addressed by the URL. The online system controls the distribution of content items based on the categorization of the URL. For example, the online system may restrict distribution of content items including URLs that access web pages with excessive poor quality content.

In an embodiment, the online system receives two markup language documents from a URL: a first, original markup document obtained by accessing the URL and a second markup document obtained by applying a content filter to the web page obtained from the URL. In an embodiment, the content filter excludes poor quality content from the web page, for example, by removing sponsored or undesirable content items from the web page. The online system compares the two markup documents to determine feature values, and provides them as input to a machine learning based model to generate a score indicating the quality of content of the webpages provided by a URL. The online system determines a rate of distribution of the content item based on the score of URLs included in the content item.

In an embodiment, the online system sorts URL's into a white list or a black list based on the determined quality score of the URL. The content items including URLs from the white list are distributed to the users of the online system, whereas contents of the blacklist may be withheld from distribution to users of the online system.

The figures depict various embodiments of the presented invention for purposes of illustration only. One skilled in the art will readily recognize from the following discussion that alternative embodiments of the structures and methods illustrated herein may be employed without departing from the principles described herein.

DETAILED DESCRIPTION

Overview

An online system, such as a social networking system, is used by content providers to distribute content. Content providers in an online system such as a social networking system may be users of the online system or third party systems. Users often upload content based on their activities, for example, images based on a trip, family photos, videos showing their activities, and so on. Third party websites may provide different types of content items for example, educational content items, content items describing sports, content items describing current news, and so on. However, there are also several third party websites that provide low quality content. In some embodiments, low quality content refers to content with a quality ranking below a threshold quality ranking. For example, the system may determine scores for quality of content, and an expert may determine a threshold level below which the content is considered low quality content. In other embodiments, low quality content is a relative term based on the quality ranking of the other content items on the page. Such third party websites provide webpages, that include only a minimal amount of content items that are actually of interest to the user and include large amount of content item that the user is unlikely to be interested in, for example, sponsored content items. For an online system, it is often difficult to regulate content providers, resulting in a significant increase in the number of content providers attempting to monetize user traffic being driven towards their webpages. The result is a low quality user experience that the online system is indirectly responsible for. Embodiments implement techniques to identify webpages with a high likelihood of providing a low quality user experience and prevent them from being presented to users of the online system.

System Architecture

Figure 1:
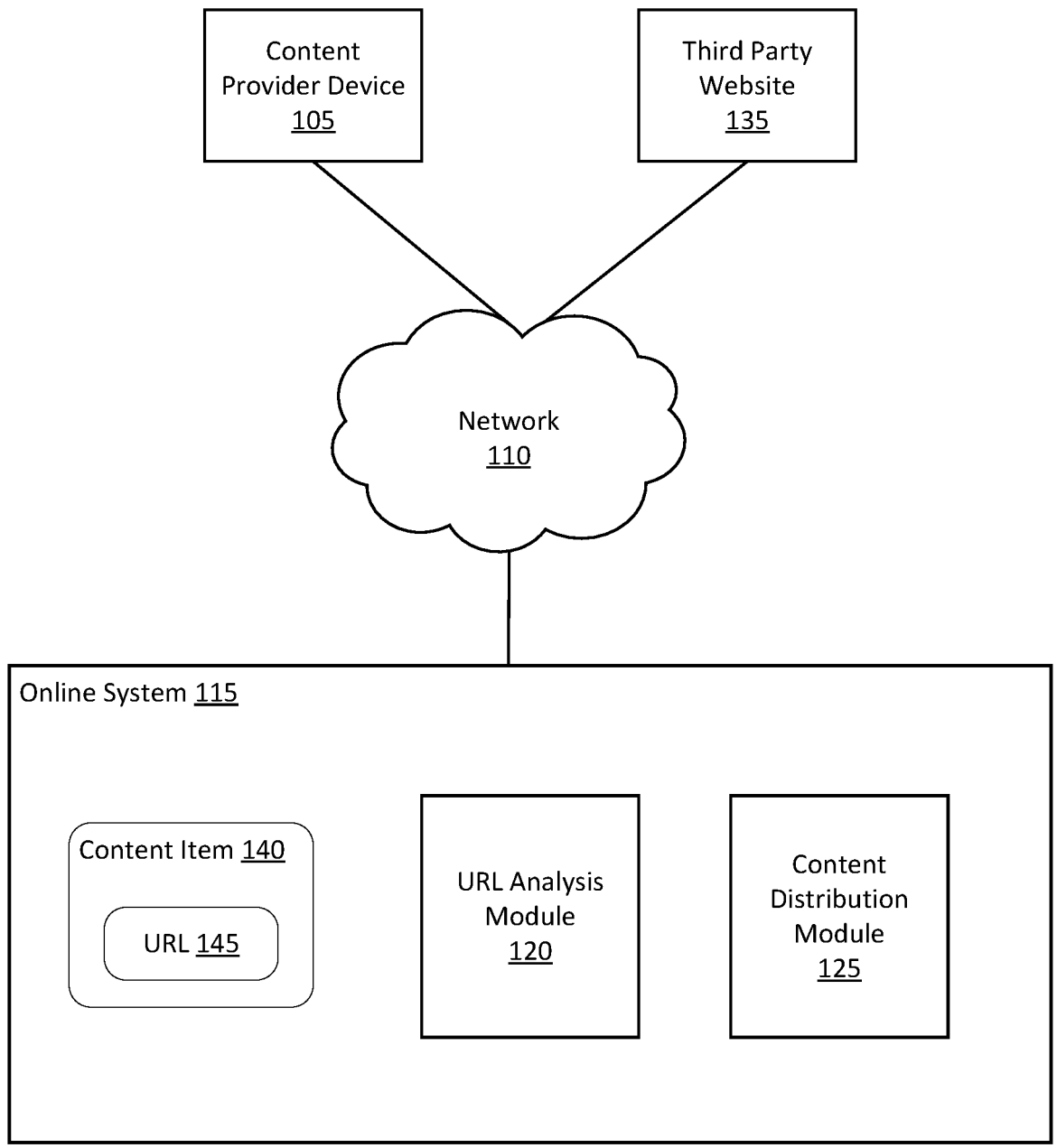
FIG. 1 is a high-level block diagram of a system environment, in accordance with an embodiment of the invention.

FIG. 1 is a block diagram of one embodiment of a system environment 100. In the embodiment shown by FIG. 1, content provider device 105, a third party website 135, the network 110, and the online system 115. However, in other embodiments the system environment 100 may include different and/or additional components.

The content provider device 105 is a computing devices capable of receiving user input with data processing and data communication capabilities. Examples of the content provider device 105 include desktop computers, laptop computers, portable computers, personal digital assistants, smart phones, or any other device including computing functionality and data communication capabilities. Content provider device 105 communicates with the online system 115 via the network 110. In one embodiment, a content provider device 105 executes an application allowing a user of the content provider device 105 to interact with the online system 115. A content provider device 105 may be used by a user of the online system 115 that consumes the services offered by the online system 115, for example, a member of a social networking system. A content provider device 105 may also be used by a user that provides content items associated with a third party to the online system 115 for distribution to the users of the online system 115. The third party may be associated with the third party website 135. The third party website provides web pages to client devices that send a request to the third party website, for example, a hypertext transfer protocol (HTTP) request. In an embodiment, the web pages generated by the third party website 135 comprise markup language documents, for example, hypertext markup language (HTML) documents.

Interactions between the content provider device 105 and the online system 115 are typically performed via the network 110, which enables communication between content providing devices 105 and the online system 115. In one embodiment, the network 110 uses standard communication technologies and/or protocols including, but not limited to, links using technologies such as Ethernet, 802.11, worldwide interoperability for microwave access (WiMAX), 3G, 4G, LTE, digital subscriber line (DSL), asynchronous transfer mode (ATM), InfiniBand, and PCI Express Advanced Switching. The network 110 may also utilize dedicated, custom, or private communication links. The network 110 may comprise any combination of local area and/or wide area networks, using both wired and wireless communication systems.

The online system 115 provides the medium for content distribution from content providers to users, as further described below. The online system 115 receives content from the content provider device 105 via the network 110 and processes the received content. In one embodiment, the online system 115 includes a URL analysis module 120 and a content distribution module 125.

The URL analysis module 120 receives content items from the content provider device 105. In some embodiments, these content items include uniform resource locators (URL's) that direct the user to the third party website 135. The URL's are provided to the online system 115 by content providers and analyzed by the URL analysis module 120 to determine a content quality score. A webpage refers to a medium for presenting users with specific content items, whereas a URL for a web page refers to a string representing an address from which a client device can access the webpage. A client device sends a request to a website identified by the URL. The website generates a webpage responsive to the request. A website may return different web pages as a result of requests sent to a particular URL. This may be because the website may send different content items embedded within the web page and may dynamically generate the web page. However, typically all web pages corresponding to a URL returned by a website have similar characteristics, for example, number of content items embedded within the web page, number of sponsored content items in the web page, amount of text in the web page, and so on. The URL analysis module 120 analyzes URL's by accessing the webpages corresponding to the URLs and analyzing them. However, in other embodiments, additional components may exist within the online system to perform analysis of individual webpages. In an embodiment, the URL analysis module 120 preprocesses the URL to extract a canonical version of the URL by removing certain portions of the URL such as portions representing request parameters that may change with every access request. The URL analysis module is further described below in reference to FIG. 2.

The content distribution module 125 selects and presents content items relevant to users of the online system. The content distribution module 125 records and excludes URL's corresponding to webpages with low content quality from presentation to users of the online system. In an embodiment, the content distribution module 125 restricts distribution of content that includes URLs determined to have low quality of content and/or include more than a threshold amount of sponsored content. In an embodiment, the content distribution module 125 withholds from users all content provided by a content provider device 105 that is blacklisted due to low content quality score and distributes content provided by a content provider device 105 that is determined to have a high content quality score. The placement of a URL on a blacklist may not immediately result in its exclusion from distribution to users of the online system, but may instead flag it as suspicious and requiring further administrative review by the online system.

Figure 2:
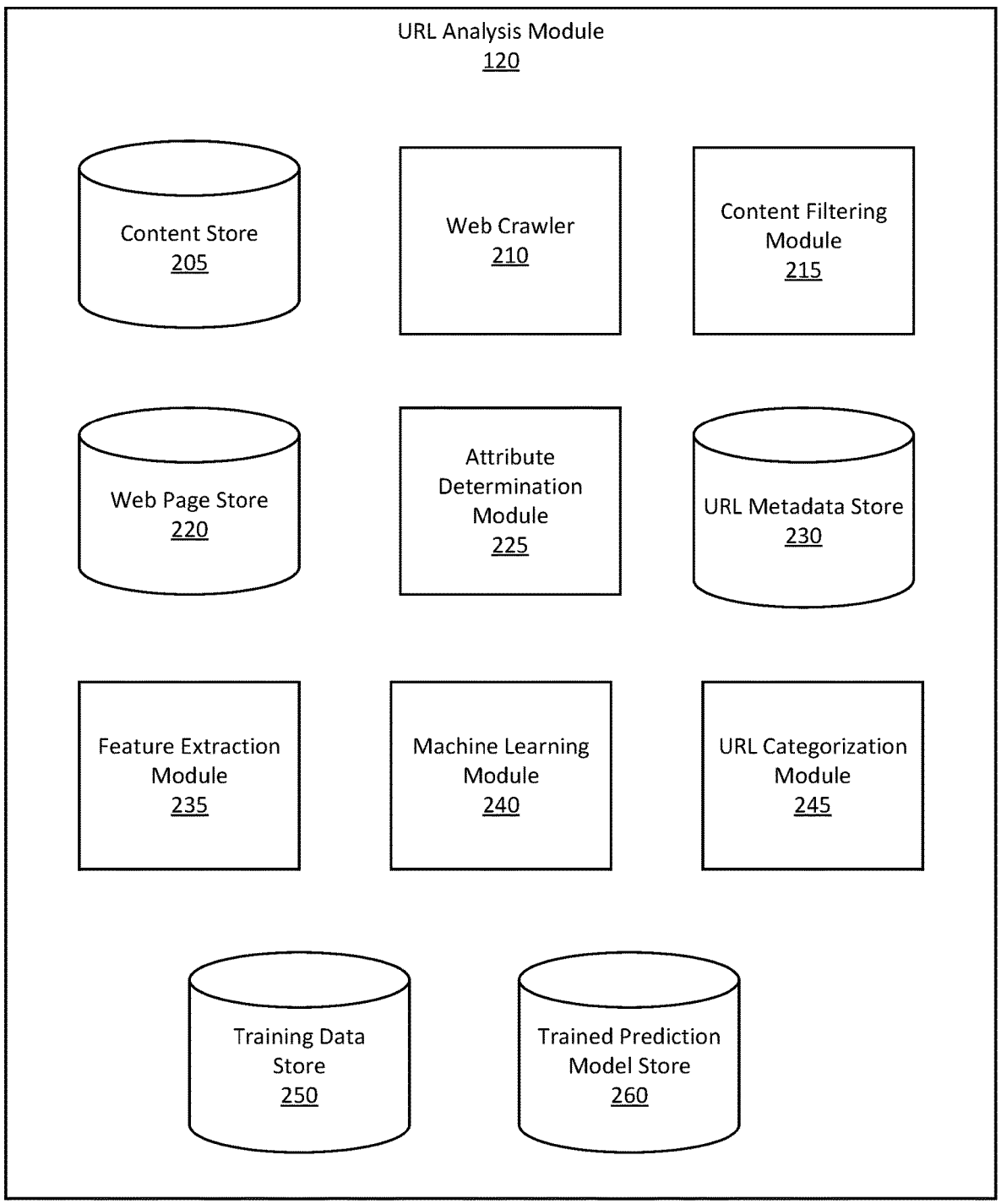
FIG. 2 is a block diagram off the URL analysis module, in accordance with an embodiment of the invention.

FIG. 2 illustrates the system architecture of the URL analysis module 120, according to an embodiment. The content analysis module 120 includes a content store 205, a web crawler 210, a content filtering module 215, a web page store 220, an attribute determination module 225, a URL metadata store 230, a feature extraction module 235, a machine learning model 240, a URL categorization module, a training data store 250, and a trained prediction model store 260. In other embodiments, the URL analysis module 120—may include more or fewer or different modules.

The content store 205 stores content items received from users and from content providers. The content store 205 also stores metadata associated with each content item with in the online system, for example, the user account of the content provider, targeting criteria associated with the content that describe attributes of users to who the content should be directed, and so on.

In various embodiments, a content item includes various components capable of being identified and retrieved by the online system 120. Example components of a content item include: a title, text data, image data, audio data, video data, a landing page, a user associated with the content item, or any other suitable information. The online system 120 may retrieve one or more specific components of a content item for presentation in some embodiments. For example, the online system 120 may identify a title and an image from a content item and provide the title and the image for presentation rather than the content item in its entirety.

Various content items may be associated with an objective that a content provider of the content item expects users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 120 logs interactions between users presented with the content item or with objects associated with the content item. Additionally, the online system 120 receives compensation from a user or content provider associated with content item as online system users perform interactions with a content item that satisfy the objective included in the content item.

Once the online system selects a URL for analysis, the web crawler 210 retrieves and provides the online system with two versions of a markup language document, for example, a Hypertext Markup Language (HTML) document obtained by accessing the selected URL. A markup language document retrieved by a browser application contains data and instructions that are executed by the browser application. For example, a markup language document can include scripts for execution by a scripting engine of the browser application. An example of a scripting language supported by browser applications is JAVASCRIPT. One copy of the markup document is the original version containing instructions to present both sponsored content items and standard content items. Sponsored content items describe content items whose primary purpose is to monetize user interactions, for example, the website may include content items from a content provider and charge the content provider for every instance that the content is presented to users accessing the webpage. These sponsored content items are considered to be low quality since these do not represent the content that the user was accessing but were simply inserted into the web page for purpose of monetization of the user interaction by the third party web site. The quality of the web page is lower if the web page includes excessive sponsored content items since it provides poor user experience. Conversely, standard content items are available for user interaction without any monetary benefits and are more relevant to the content of the web page that the user was attempting to access.

The online system determines the second markup language document by passing the accessed web page through the content filtering module 215 to remove sponsored content items. The product is a second markup language document, which if executed would only present non-sponsored content items. The content filtering module 215 may use various features of a content item to determine whether it is a sponsored content item. In an embodiment, the content filtering module 215 analyzes the features of content items to determine whether the content items is sponsors, for example, key words used in the content item, logos used in the content item, metadata describing the content items, information in the headers of each content item that identifies the content provider 105 of the content item and their affiliations. In some embodiments, the content filtering module 215 determines whether the content provider 105 associated with the URL is affiliated with a network of sponsored content providers which results in the flagging of the content item as sponsored content and its removal from the filtered markup language document. A network of content providers refers to a group of content providers that use a common service, for example, a content exchange service that connects content providers with online systems that manage the distribution of sponsored content items. A network of content providers may have a signature set of metadata or instructions that are stored in the header of content items from content providers of that network. The content filtering module 215 analyzes the header of a content item to determine whether the header includes a signature of a network of content providers and flags the content item as a sponsored content item to be filtered from the HTML web page.

Furthermore, the online system analyzes the flagged sponsored content items and their sponsored content networks for characteristics such as a type of sponsored content items, the amount of sponsored content items from different networks within the markup document, and characteristics of those content items. The online system may store the identified characteristics of sponsored content items and the sponsored content item networks for future reference to analyze subsequent URL's received by the online system.

Both markup language documents are stored within the web page store 220 along with other markup documents received from previous searches of URL's. From the web page store 220, the attribute determination module 225 identifies and records particular attributes of both markup documents. In some embodiments, identified attributes may be quantitative qualities such as a number of content items on the webpage, an amount of area on the webpage occupied by content items, a count of the number of text characters on the webpage, an amount of area on the webpage occupied by text, a number of media objects on the webpage, or an amount of URL's embedded in content items in the webpage. Alternate embodiments of the invention may identify more attributes, less attributes, or a different combination of attributes. Certain attributes may be characterized quantitatively as a numerical count (e.g., the number of content items, number of text characters, number of embedded URL's, or number of media objects) or as a percentage (amount of area on the webpage occupied by content items, amount of area on the webpage occupied by text). Additionally, the same attributes must be identified in both the original and the filtered markup document. For example, if the attribute determination module 225 determines that the original markup document includes four images, but the filtered markup document includes zero images (because all the images were determined to be sponsored content items), the attribute determination module records the number of images as zero. All characteristics and details of the extracted attributes for both documents are stored within the URL metadata store 230.

As described previously, the online system uses machine learning techniques to assess the content quality of the identified URL's using inputs derived from the particular attributes of the markup documents stored in the URL metadata store 230. The generation of those inputs is performed by the feature extraction module 235 by comparing a particular attribute found in the original markup document to the same particular attribute found in the filtered markup document. The numerical characterization of these comparisons between attributes is referred to as a feature value. In some embodiments, feature values may be represented as a value derived from a ratio between the numerical value of the attribute in the original document and the numerical value of the attribute in the filtered document (e.g., a feature value of 0.25, based on a 1:4 ratio of images of sponsored content items in the filtered document to the original document). In alternate embodiments, the numerical value of the attribute in the original document may be represented as a value derived from a difference between the numerical value of the attribute in the original document and the numerical value of the attribute in the filtered document (e.g., a feature value of 3 based a difference of 4 images of sponsored content items in the original document to the filtered document). In some embodiments, feature values may be determined using one or more of the above techniques or a different set of techniques altogether.

The machine learning module 240 uses machine learning techniques to generate a prediction model configured to predict a content quality rating of a URL. The prediction model determines an output score based on a weighted aggregate of feature scores corresponding to various features extracted by the feature extraction model 235. In one embodiment, the machine learning module 240 determines weights of various feature values used by the prediction model based on training data in the training data store 250 in a process further described in reference to FIG. 4. The prediction model is invoked to categorize URL's stored in the webpage store 220. For example, URL's with content quality scores above a threshold may be permitted for distribution to users of an online system, whereas URL's with content quality scores below a threshold may be excluded from distribution to users of an online system. As another example, the content distribution module 125 determines a rate of distribution of a content item to users of the online system based on the content quality scores of URLs included in the content item. Accordingly, the content distribution module 125 decreases the rate of distribution of content items including URLs with excessive sponsored content items but distributes other content items without such URLs at a higher rate. In an embodiment, the prediction model comprises a set of weights that are used by the machine learning module 240 to determine a score for a given content item. In another embodiment, the prediction model comprises a set of weights as well as instructions for aggregating feature values using the weights to determine the output score. Based on the content quality score calculated by the prediction module, the URL categorization module sorts the URL onto a blacklist or a whitelist as discussed above.

In some embodiments, the machine learning module 208 uses machine learning techniques including, for example, linear regression, decision trees, support vector machines, classifiers (e.g., a Naive Bayes classifier), fuzzy matching, and gradient boosting. For example, a classifier based machine learning model may classify a URL as either high content quality or low content quality. The machine learning module is further described below in conjunction with FIG. 3.

The training data store 250 stores content items that are used by the machine learning module for training a prediction model. The attribute determination module 225 identifies the particular attributes of the markup documents comprising the training data set and the feature extraction module calculates feature values to be used as the inputs for the training model. Additionally, URL's within the training data set are classified as having high quality content or low quality content based on surveys received by the online system 115 from the users of the online system 115. In one embodiment, user surveys consists of a single question requesting a binary qualification of content as "high quality" or "low quality," while in other embodiments the surveys may consist of multiple questions culminating in a final determination of either high quality or low quality. The results of the user surveys assist the machine learning model 230 in determining specifically what constitutes a URL that is detrimental to a user experience and subsequently the necessary conditions regarding the attributes and features values. Using the known quality labels for URL's within the training data store 250 and the determined feature values as inputs for the prediction model from feature extraction module 235, the prediction model can be iteratively refined and trained to compute accurate categorizations for URL's provided by content provider devices 105. The trained prediction model store 260 stores the prediction models that have been trained by the machine learning module 230.

Performing the URL Analysis

In one embodiment, the online system analyzes URL's posted by content provider devices 105 before allowing the URL to be distributed as a content item or content items including the URLs to users of the online system 105. In the embodiment, the online system receives, from the web crawler 210 and a content filtering module 215, two markup language documents from the same URL and determines a single content quality score for the URL. If the determined score is indicative of a high quality of content, the URL is distributed throughout the online system 115 to users.

Figure 3:
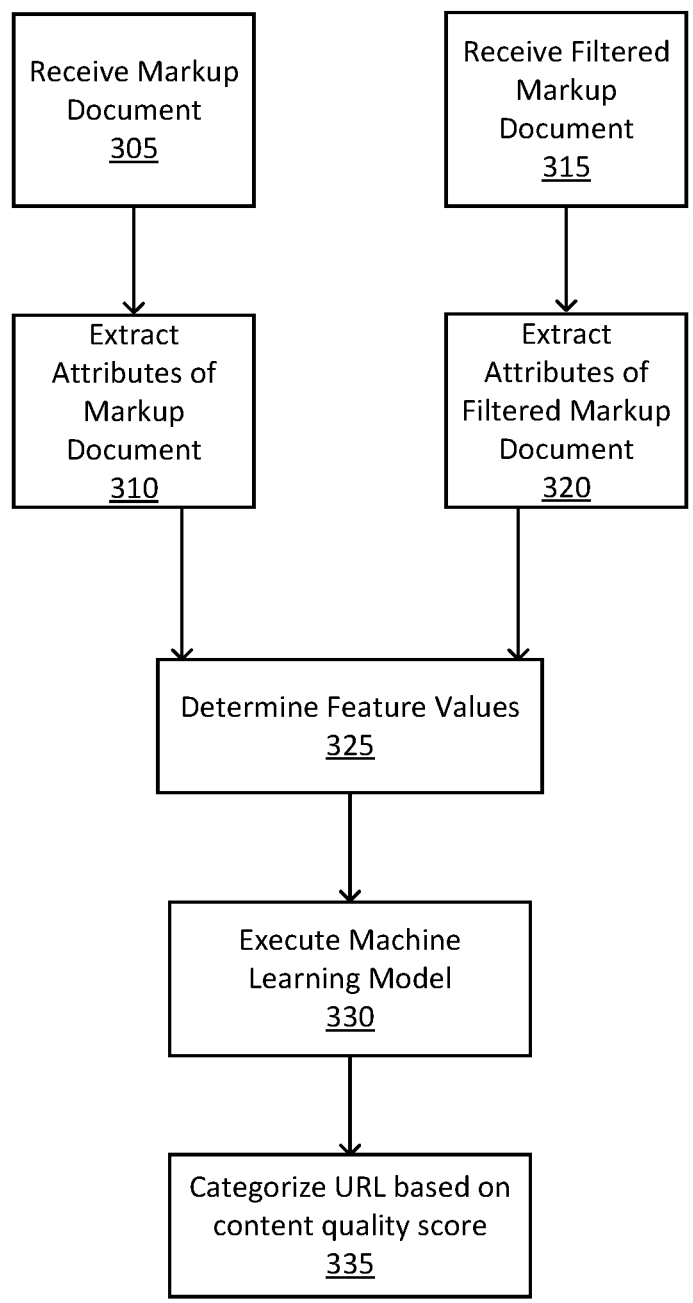
FIG. 3 is a flow chart of the URL categorization process, in accordance with an embodiment of the invention.

FIG. 3 illustrates a flow chart of on embodiment of a method 300 for performing the URL analysis. In one embodiment shown in FIG. 3, the online system receives 305 a markup language document from a web crawler 210 which crawls a URL stored within the content store 205. The markup language document is the original version of the URL's markup document. Next, the attribute determination module 225 extracts 310 attributes of the original markup document stores the extracted attributes in the URL metadata store 230. Details regarding the attributes and the attribute determination module 225 are discussed above in reference to FIG. 2. Simultaneously, the online system also receives 315 a second markup document from the web crawler 210 which, unlike the original, has been processed by the content filtering module 215. As discussed previously, as a result of this processing, the second markup document, the filtered markup document, no longer contains instructions for presenting sponsored content items in any subsequently generated webpages. Similarly to the original markup document, the attribute determination model 225 extracts 320 the same attributes from the filtered markup documents as were extracted from the original markup document.

Next, the feature extraction module 325 determines 325 numerical feature values based on comparisons of the same attributes between the two markup documents. The machine learning model 240 is executed 330 using the determined feature values are used as the inputs for the prediction model. The result is a computed content quality score based on the various characteristic attributes of URL ranging between 0 and 1. URL's may be categorized 335 using a binary high quality-low quality system wherein the range of content quality scores is divided into two ranges: one indicating high content quality and the other indicating low quality. In one embodiment, the high quality content category may apply to scores from 0.5-1.0 and the low quality content category may apply to scores from 0.0-0.4. In other embodiments, URL's may be categorized into additional categories with varying ranges of eligible scores.

Training the Machine Learning Model

Figure 4:
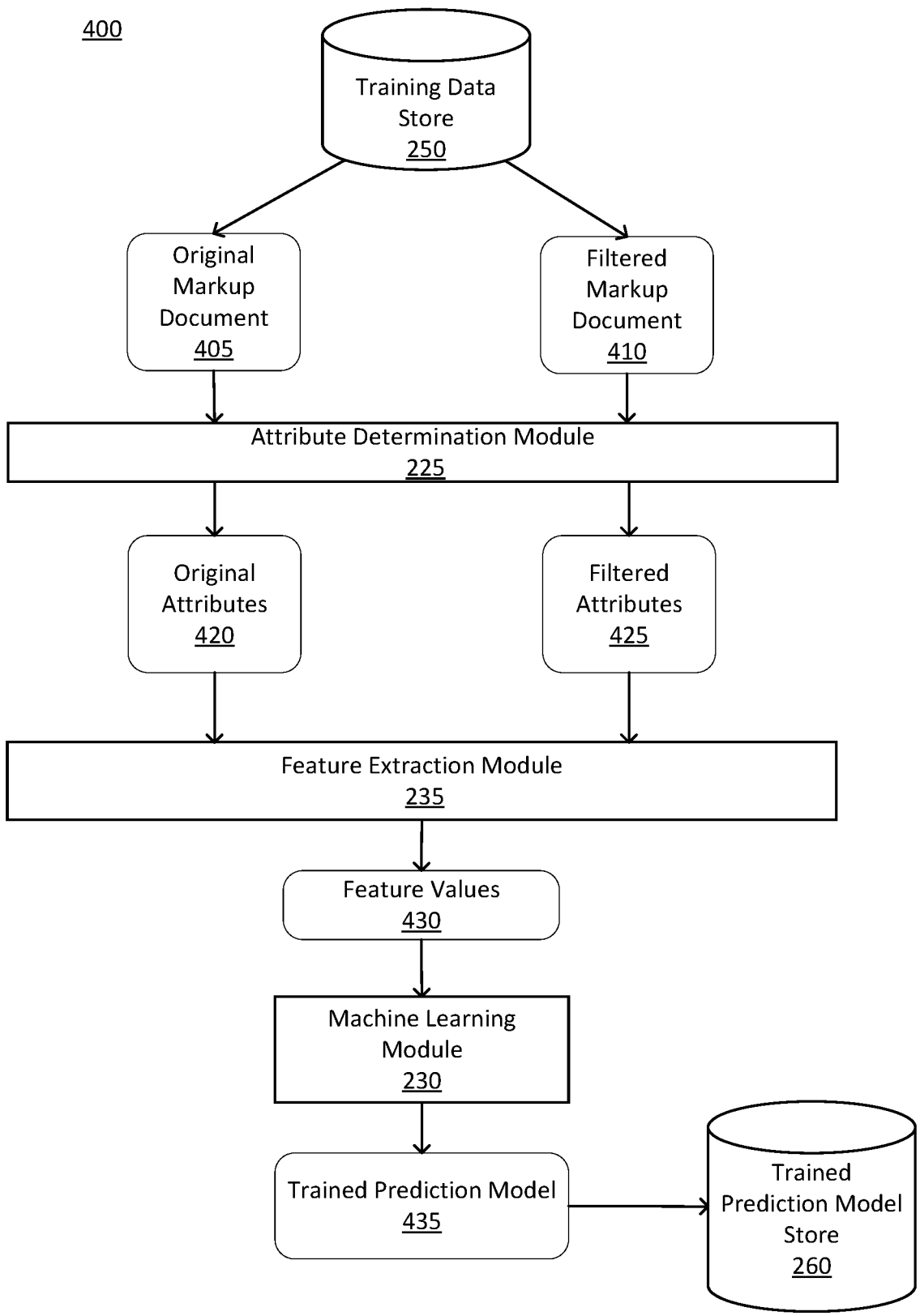
FIG. 4 is a flow chart of the process for training the machine learning model, in accordance with an embodiment of the invention.

FIG. 4 is a flow chart 400 illustrating the interactions between various types of data stored in an online system 115 for training a machine learning model 240. The training data store 250 contains data associated with URL's that are labeled. The URLs may be labeled based on user feedback, for example, based on expert input. Specifically, for all URL's within the store, the training data store 250 contains the original markup document 410, the filtered markup document 410, and a label indicating a category 415 of the URL's content. The label indicating a category 415 may use a label with two options: a "1" indicating high quality content or a "0" indicating low quality content. For example, a "0" label indicates that the URL corresponds to a web page that includes excessive sponsored content whereas a "1" label indicates that the URL corresponds to a web page that does not include excessive sponsored content. The machine learning module 230 trains a machine learning based model configured to predict the label of a URL. In some embodiments, the machine learning based model generates a score having a continuous value, for example, a high value of score indicating a high quality of content of web pages returned by the URL and a low value of score indicating a low quality of content of web pages returned by the URL. Alternatively, the machine learning based model 435 may generate a score value such that a high score indicates a high amount of sponsored content in web pages returned by the URL and a low score indicates a low amount of sponsored content in web pages returned by the URL.

From the training data store 205, the original markup document 405 and the filtered markup document 410 are processed by the attribute determination module 225 to identify the attributes 420 of the original markup document and the filtered attributes 425 of the filtered markup document. Both sets of attributes 420 and 425 are then processed by the feature extraction module 235 to determine the feature values 430 for that URL. Those feature values 430 are used as inputs for the machine learning module 230 which trains a machine learning based model to generate a trained prediction model 435. The machine learning module 230 stores the trained model in the trained prediction model store 260. The trained prediction model 435 is used to categorize URLs, for example, using the process illustrated in FIG. 3.

ALTERNATIVE EMBODIMENTS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer implemented method comprising:
    receiving, by an online system, a content item to be presented to a user of the online system, the content item comprising a uniform resource locator (URL), wherein the URL navigates the user to a webpage associated with the URL;
    responsive to navigating to the webpage,
        receiving an input markup language document of the webpage, the input markup language document comprising instructions for presenting content on the webpage;
        applying a content filter to the input markup language document to generate a filtered markup language document of the webpage, wherein the content filter removes sponsored content on the webpage from the input markup language document;
    accessing a machine learning based model trained to generate a content quality score for the webpage, wherein the content quality score indicates a quality of content presented on the webpage;
    executing the machine learning based model using a plurality of features comprising at least a feature representing a value based on a comparison of an attribute describing content items of the input markup language document and an attribute describing content items of the filtered markup language document, the execution generating a content quality score of the webpage; and
    responsive to the content quality score being below a threshold, restricting, by the online system, a distribution of content comprising the URL associated with the webpage to users of the online system.

2. The computer implemented method of claim 1, wherein the content filter prevents sponsored content items included in the webpage and provided by a third party from being displayed on the webpage.

3. The computer implemented method of claim 1, wherein the plurality of features further comprises a feature attribute describing a number of content items in the webpage responsive to rendering the webpage.

4. The computer implemented method of claim 1, wherein the plurality of features further comprises a feature describing an amount of area of the webpage occupied by content items responsive to rendering the webpage.

5. The computer implemented method of claim 1, wherein the plurality of features further comprises a feature describing text of the markup language document.

6. The computer implemented method of claim 1, wherein the plurality of features further comprises a feature describing a number of media objects on the webpage responsive to rendering the webpage.

7. The computer implemented method of claim 1, wherein the plurality of features further comprises a feature representing one or more URLs embedded in content items in the webpage responsive to rendering the webpage, the embedded URLs redirecting viewing users to a webpage related to the sponsored content item.

8. The computer implemented method of claim 1, wherein the plurality of features further comprises a feature describing a percentage of the webpage occupied by text.

9. The computer implemented method of claim 1, wherein the machine learning based model comprises a gradient boosted decision tree.

10. The computer implemented method of claim 1, wherein the machine learning based model is trained using a training set of webpages, each webpage of the training set associated with a label indicating a content quality score of the webpage, the content quality score being determined based on user feedback.

11. The computer implemented method of claim 1, wherein the webpages comprising the training set are labeled based on their content quality scores, the content quality score being determined based on user feedback surveys.

12. The computer implemented method of claim 11, wherein webpages including excessive third party content are associated with labels indicating low content quality scores representing low quality of content.

13. A non-transitory computer readable medium storing instructions comprising:
receiving, by an online system, a content item to be presented to a user of the online system, the content item comprising a uniform resource locator (URL), wherein the URL navigates the user to a webpage associated with the URL;
responsive to navigating to the webpage
receiving an input markup language document of the webpage, the input markup language document comprising instructions for presenting content on the webpage;
applying a content filter to the input markup language document to generate a filtered markup language document of the webpage, wherein the content filter removes sponsored content on the webpage from the input markup language document;
accessing a machine learning based model trained to generate a content quality score for the webpage, wherein the content quality score indicates a quality of content presented on the webpage;
executing the machine learning based model using a plurality of features comprising at least a feature representing a value based on a comparison of an attribute describing content items of the input markup language document and an attribute describing content items of the filtered markup language document, the execution generating a content quality score of the webpage; and
responsive to the content quality score being below a threshold, restricting, by the online system, a distribution of content comprising the URL associated with the webpage to users of the online system.

14. The non-transitory computer readable medium of claim 13, wherein the content filter prevents the display of sponsored content items included in the webpage and provided by a third party.

15. The non-transitory computer readable storage medium of claim 13, wherein the plurality of features further comprises:
a number of content items in the webpage responsive to rendering the webpage;
an amount of area on the webpage occupied by content items responsive to rendering the webpage;
text of the markup language document;
a number of media objects on the webpage responsive to rendering the webpage;
one or more URL's embedded in content items in the webpage responsive to rendering the webpage; and
a percentage of the webpage occupied by text.

16. The non-transitory computer readable medium of claim 13, wherein the machine learning based model is trained using a training set of webpages, each webpage of the training set associated with a label indicating a content quality score of the webpage, the content quality score being determined based on user feedback.

17. The non-transitory computer readable medium of claim 16, wherein webpages including excessive third party content are associated with labels indicating low content quality scores representing low quality of content.

18. A computer implemented method comprising:
receiving, by an online system, a content item to be presented to a user of the online system, the content item comprising a uniform resource locator (URL), wherein the URL navigates the user to a webpage associated with the URL;
responsive to navigating to the webpage
receiving an input markup language document of the webpage, the input markup language document comprising instructions for presenting content on the webpage;
applying a content filter to the input markup language document to generate a filtered markup language document of the webpage, wherein the content filter removes sponsored content on the webpage from the input markup language document;
executing a machine learning based model to generate content quality score for the webpage using a plurality of features comprising at least a feature representing a value based on a comparison of an attribute describing content items of the input markup language document and an attribute describing content items of the filtered markup language document, the execution generating a content quality score of the webpage; and
responsive to the content quality score being below a threshold, restricting, by the online system, a distribution of content comprising the URL associated with the webpage to users of the online system.

19. The computer implemented method of claim 18, wherein the content filter prevents sponsored content items included in the webpage and provided by a third party from being displayed on the webpage.

20. The non-transitory computer readable storage medium of claim 18, wherein the plurality of features further comprises:
a number of content items in the webpage responsive to rendering the webpage;
an amount of area on the webpage occupied by content items responsive to rendering the webpage;
text of the markup language document;
a number of media objects on the webpage responsive to rendering the webpage;
one or more URL's embedded in content items in the webpage responsive to rendering the webpage; and
a percentage of the webpage occupied by text.

* * * * *

UNITED STATES PATENT AND TRADEMARK OFFICE
CERTIFICATE OF CORRECTION

PATENT NO.        : 10,853,431 B1
APPLICATION NO.   : 15/854667
DATED             : December 1, 2020
INVENTOR(S)       : Lin et al.

Page 1 of 1

It is certified that error appears in the above-identified patent and that said Letters Patent is hereby corrected as shown below:

On the Title Page

Item (74), in "Attorney, Agent, or Firm", Line 1, delete "Fedwick" and insert -- Fenwick --, therefor.

In the Claims

Column 11, Claim 13, Line 38, after "webpage" insert -- , --.

Column 12, Claim 15, Line 1, after "readable" delete "storage".

Column 12, Claim 18, Line 28, after "webpage" insert -- , --.

Column 12, Claim 20, Line 52, delete "non-transitory computer readable storage medium" and insert -- computer implemented method --, therefor.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*